United States Patent [19]

Mitchell et al.

[11] Patent Number: 4,518,276
[45] Date of Patent: May 21, 1985

[54] METHOD AND APPARATUS FOR REPEATABLY ALIGNING ADJACENT MEMBER

[75] Inventors: Thomas L. Mitchell, Washington; Patrick D. McMahill, Chillicothe; Gary G. Valbert, Peoria; John C. Wellauer, Dunlap, all of Ill.

[73] Assignee: Caterpillar Tractor Co., Peoria, Ill.

[21] Appl. No.: 583,906

[22] Filed: Feb. 27, 1984

[51] Int. Cl.³ .............................................. F16B 17/00
[52] U.S. Cl. .................................... 403/13; 403/408; 29/466
[58] Field of Search ............... 403/12, 13, 14, 337, 403/408; 411/546; 29/466, 464, 465

[56] References Cited

U.S. PATENT DOCUMENTS

| 1,584,711 | 5/1926 | Astrom | 403/408 |
| 2,828,607 | 4/1958 | Johnson | 403/408 X |
| 3,008,368 | 11/1961 | Hammitt et al. | 411/546 X |
| 3,725,993 | 4/1973 | Siler | 403/408 X |
| 4,089,613 | 5/1978 | Babbitt, Jr. | 403/388 |
| 4,309,123 | 1/1982 | Moore | 403/408 |

FOREIGN PATENT DOCUMENTS 838103  6/1981  U.S.S.R. ............... 403/408

Primary Examiner—Andrew V. Kundrat
Attorney, Agent, or Firm—Larry G. Cain

[57] ABSTRACT

Devices have been used to compensate for misalignment between adjacent members and establish subsequent aligned assembly. These devices used tight tolerance, compound eccentric bushings or offset frusto-conical surface in attempting to provide a fixed aligned position. These devices are expensive and difficult to align. The subject bolt-on dowel provides a simple inexpensive solution to positioning of a first member relative to a second member. The bolt-on dowel includes a cylindrical spacer slidably fitted within a bore of the first member with the first end being in abutment with the second member, and a fastening member securing the spacer to the second member in a fixed position.

7 Claims, 4 Drawing Figures

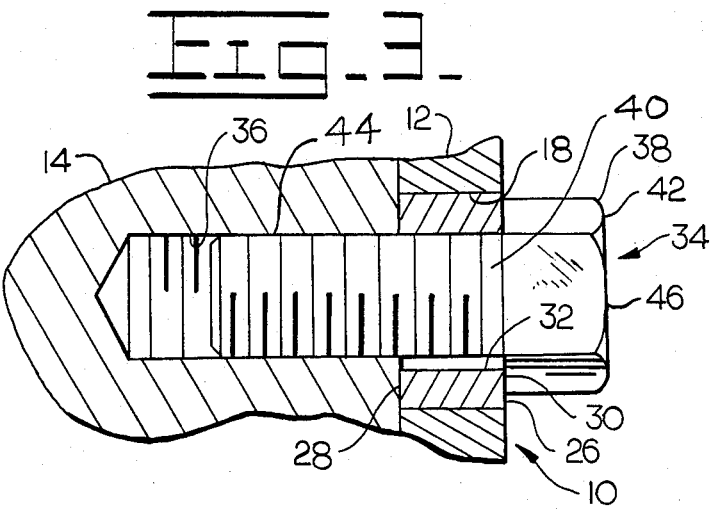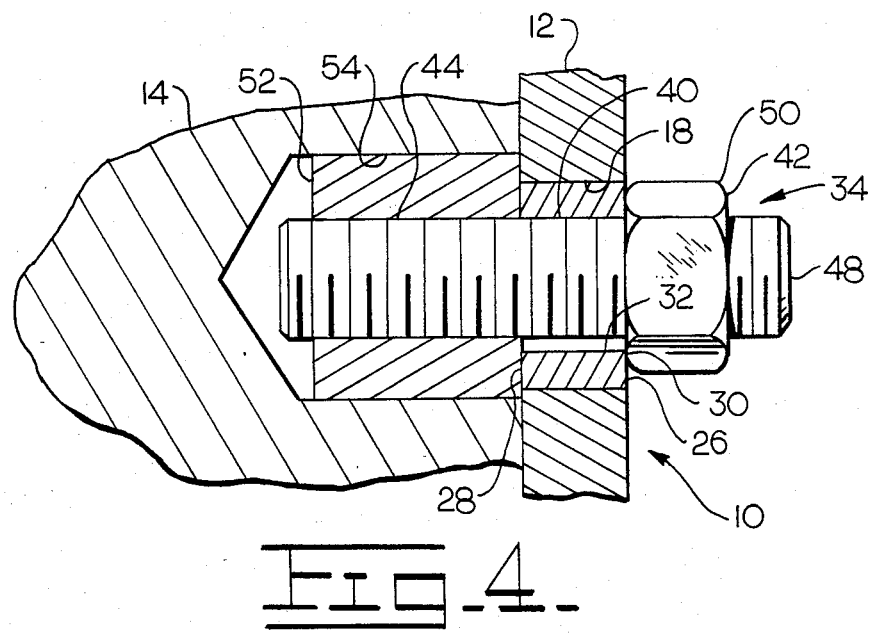

4,518,276

METHOD AND APPARATUS FOR REPEATABLY ALIGNING ADJACENT MEMBER

TECHNICAL FIELD

This invention relates generally to alignment devices and more specifically to alignment devices wherein misalignment between adjacent members can be compensated for and repetitive alignment established.

BACKGROUND OF THE INVENTION

A dowel pin is frequently used to align two abutting members. The alignment of the two abutting members is established by the geometric accuracy of the bores in which the dowel is inserted. The tight tolerance required to assure this accuracy is costly to manufacture and difficult to repeatably attain between component parts.

U.S. Pat. No. 4,089,613 discloses a device for connecting two members through bores therein without requiring true alignment of the bores. A cup-shaped bushing with a frusto-conical interior surface is engaged with the frusto-conical outer surface of an elongate pin. Both the pin and the bushing include a bore for receipt of a fastener. The frusto-conical surface of the pin and/or the bushing is eccentric with respect to the longitudinal axis of the element on which the surface is formed. Rotation of the bushing within a bore of one of the members will allow the bushing to assume a position by virtue of the eccentricity of the frusto-conical surface of the bushing and/or pin that will compensate for an offset due to the misalignment of the bores. As the pin is drawn into the bushing by a fastener, the wall of the bushing is expanded to tightly engage the bushing against the bore of the member. The other end of the pin is cylindrical and slidably engages the bore of the second member, thereby restraining relative motion of the two members.

The device described above has the disadvantages of being costly to manufacture and difficult to align. The compound eccentrics must be aligned to compensate for the misalignment between adjacent members. If the eccentrics are misaligned the fastener and the component parts are placed in a bind and adjacent members are not aligned properly.

The present invention is directed to overcoming one or more of the problems as set forth above.

DISCLOSURE OF THE INVENTION

In one aspect of the present invention a bolt-on dowel is adapted to position a first member relative to a second member. The first member has a through bore and is releasably connected to the second member. More specifically the bolt-on dowel comprises a cylindrical spacer having a first end, a second end and a through bore. The spacer is adapted to closely slidably fit within the bore of the first member and the first end of the spacer abuts the second member. A securing means positions the spacer at one of a multiplicity of positions at the initial assembly of the first member to the second member.

In another aspect of the present invention a method of obtaining a position of a first member relative to a second member wherein the first member is releasably connected to the second member and has a through bore therein comprises the following steps: abutting the first member against the second member to generally position the first member relative to the second member; aligning the first member relative to the second member; connecting the first member to the second member in the aligned position; slidably fitting a cylindrical spacer within the bore of the first member, abutting the first end against the second member and securing a first end of the spacer against the second member.

In yet another aspect of the invention a threaded insert is secured within a bore of the second member.

BRIEF DESCRIPTION OF THE DRAWINGS

FIG. 3 is a sectional view taken along the line III—III of FIG. 1.

FIG. 4 is a sectional view of an alternate embodiment.

BEST MODE FOR CARRYING OUT THE INVENTION

Figure 1:
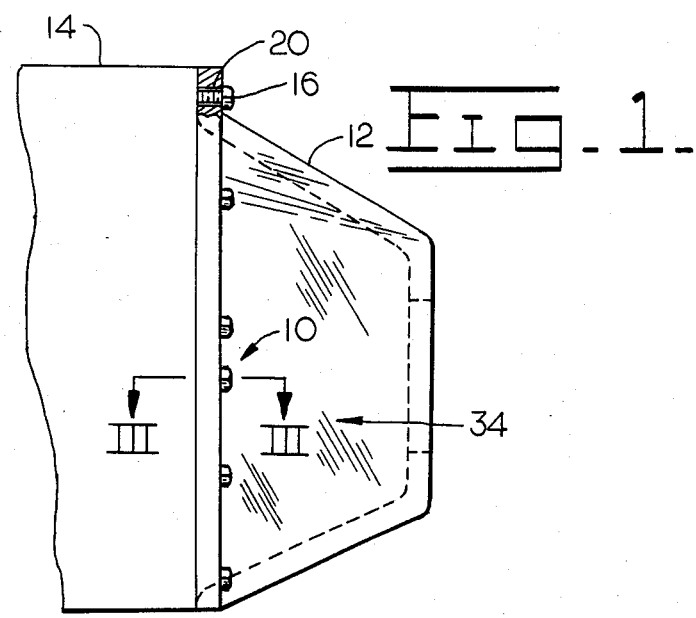
FIG. 1 is a partial sectioned side elevational view of a first and second member aligned relative to each other using the bolt-on dowel to establish the alignment.
Figure 2:
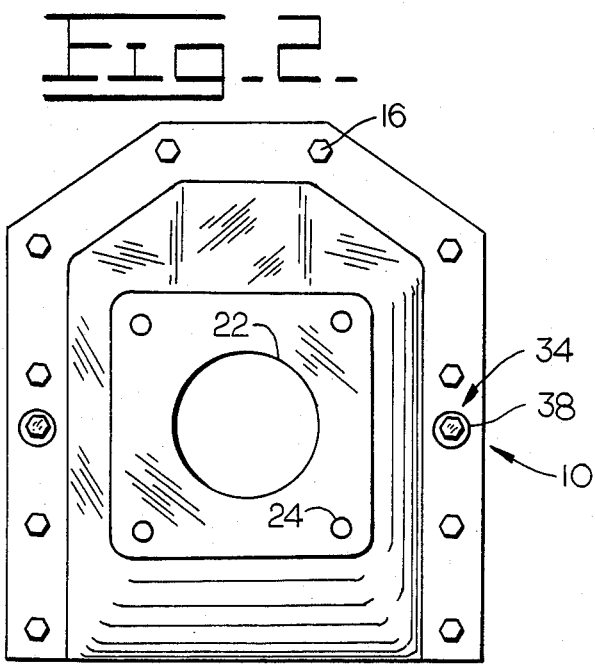
FIG. 2 is an end view showing a plurality of bolt-on dowels for aligning first and second members.

In reference to FIGS. 1 and 2 a bolt-on dowel 10 positions a first member 12 relative to a second member 14. The first member 12 is releasably connected to the second member 14 with a plurality of bolts 16 and has a through bore 18 located therein. The bolts 16 are fitted within clearance holes 20 to allow for movement between the first and second members 12,14. A bore 22 is located in the first member 12 and a plurality of threaded holes 24 are disposed about the bore 22.

As shown in FIG. 3 the bolt-on dowel 10 includes a cylindrical spacer 26 having a first end 28, a second end 30 and a through bore 32. The spacer 26 is slidably closely fitted within the bore 18 of the first member 12. The first end 28 of the spacer 26 abuts the second member 14. Means 34 for securing the spacer 26 to the second member 14 includes a threaded bore 36 in the second member 14 and a fastening member 38. The fastening member 38 has a shank 40 and an enlarged portion or head 42. The shank 40 has a threaded portion 44 located thereon. The shank 40 is loosely located within the bore 32 of the spacer 26. The enlarged portion 42 contacts the second end 30 of the spacer 26 and the threaded portion 44 engages the threaded bore 36 in the second member 14. The enlarged portion 42 of the fastening member 38 is smaller in diameter than the bore 18 and will pass therethrough. The fastening member 38 of the embodiment shown in FIG. 3 is a bolt 46 and the enlarged portion 42 is the head of the bolt.

Alternatively as shown in FIG. 4 the fastening member 38 is a stud 48 and nut 50. FIG. 4 also shows a variation of the securing means 34 having a threaded insert 52 suitably connected in a bore 54 of the second member 14 becoming a permanent part of the second member. The other component and locations as disclosed earlier remain identical.

INDUSTRIAL APPLICABILITY

The bolt-on dowel 10 is used to position or align the first member 12, such as a housing, relative to the second member 14, such as a block, in one of a multiplicity of positions so that the housing 12 is automatically repositioned after disassembly and subsequent reassembly. For example, the bore 22 in the housing 12 is used to pilot a transmission or accessory. The threaded holes 24 are used to secure the transmission or accessory to the housing 12. Since the transmission or accessory must accurately align with another component carried by the block, it is therefore desirous to properly align the housing 12 with the block 14.

The housing 12 is abutted against the block 14 and bolted into a temporary position with bolts 16. The housing 12 is aligned with the block 14 and the bolts 16 secured to the block 14 aligning the housing 12 in position. The spacer 26 is inserted into the bore 18 in the housing 12 with the first end 28 abutting the block 14. The shank 40 of the bolt 46 is positioned within the bore 32 of the spacer 26 and the threaded portion 44 of bolt 40 is engaged with the threaded bore 36 in the block 14. The bolt head 42 engages the spacer 26 insuring that the spacer 26 abuts the block 14 and is held in a permanent position. Thusly, the housing 12 is aligned with the engine block 14 and can be removed and reassembled in aligned relationship without further realigning of the housing 12 to the block 14.

Upon disassembly of the housing 12 the bolts 16 holding the housing 12 to the block 14 are removed. The bolt 46 holding the spacer 26 remains attached to the block 14 and the housing 12 is slid off the spacer 26 and over the head 42 of the bolt 46 completing the disassembly. After servicing the components within the housing 12, the housing 12 can be reassembled by simply sliding the housing 12 over the head 42 of the bolt 46 and onto the spacer 26. The spacer 26 which has remained attached to the block will subsequently realign the housing 12 in reference to the block 14 and does not require realignment. The bolts 16 holding the housing 12 to the block 14 are installed and tightened securing the housing 12 to the block 14 in its desired alignment position.

Other aspects, objects and advantages of this invention can be obtained from a study of the drawings, disclosure and the appended claims.

We claim:

1. A bolt-on dowel adapted to repeatably position a first member relative to a second member, said first member being releasably connected to said second member and having a through bore therein, comprising:
    a cylindrical spacer having a first end, a second end and a through bore, said spacer being adapted to closely slidably fit within said bore of the first member and the first end being in abutment with the second member; and
    means for securing the spacer to the second member at one of a multiplicity of positions at the initial assembly of the first member to the second member so that the cylindrical spacer remains in abutment with the second member when the first member is released from the second member and repositions the first member relative to the second member at subsequent assembly.

2. The bolt-on dowel of claim 1, wherein the securing means includes a threaded bore in the second member and a fastening member having a shank and an enlarged portion contacting the second end of the spacer, said shank being loosely located within the bore of the spacer and having a threaded portion 44 thereon engaging the threaded bore in the second member.

3. The bolt-on dowel of claim 2, wherein said enlarged portion is of a size smaller than the bore of the first member and will pass through the bore.

4. A bolt-on dowel adapted to repeatably position a first member relative to a second member, said first member being releasably connected to said second member and having a through bore therein, comprising:
    a cylindrical spacer having a first end, a second end and a through bore, said spacer being adapted to closely slidably fit within said bore of the first member and the first end being in abutment with the second member; and
    means for securing the spacer to the second member at one of a multiplicity of positions at the initial assembly of the first member to the second member, said means including a bore in the second member, a threaded insert secured into said bore, and a fastening member having a shank and an enlarged portion contacting the second end of the spacer, said shank being loosely located within the bore of the spacer and having a threaded portion engaging the threaded insert.

5. The bolt-on dowel of claim 4, wherein said enlarged portion is of a size smaller than the bore of the first member and will pass through the bore.

6. A method of obtaining a position of a first member relative to a second member, said first member being releasably connected to said second member and having a through bore therein, the improvement comprising the steps of:
    abutting the first member against the second member to generally position the first member relative to the second member;
    slidably fitting a cylindrical spacer within the bore of the first member and abutting the first end against the second member;
    aligning the first member relative to the second member;
    connecting the first member to the second member in the aligned position; and
    securing a first end of the spacer against the second member.

7. The method of obtaining repeatable positioning of claim 6, wherein said step of securing of the first end of the spacer against the second member includes the steps of:
    inserting a shank of a fastening member within a bore of the spacer;
    engaging a threaded portion of the shank within a threaded bore of the second member;
    contacting an enlarged portion of the fastening member against a second end of the spacer; and
    securing the fastening member in the second member so that the spacer remains in a stationary position.

* * * * *